United States Patent
Ikegami

(10) Patent No.: US 10,728,441 B2
(45) Date of Patent: Jul. 28, 2020

(54) IMAGE CAPTURING CONTROL APPARATUS, METHOD OF CONTROLLING THE SAME AND COMPUTER READABLE STORAGE MEDIUM

(71) Applicant: CANON KABUSHIKI KAISHA, Tokyo (JP)

(72) Inventor: Hideyuki Ikegami, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 245 days.

(21) Appl. No.: 15/862,764

(22) Filed: Jan. 5, 2018

(65) Prior Publication Data

US 2018/0205878 A1 Jul. 19, 2018

(30) Foreign Application Priority Data

Jan. 13, 2017 (JP) .................................. 2017-004607

(51) Int. Cl.
*G06F 3/048* (2013.01)
*H04N 5/232* (2006.01)
*G06F 3/0484* (2013.01)

(52) U.S. Cl.
CPC ..... *H04N 5/23216* (2013.01); *G06F 3/04845* (2013.01); *G06F 3/04847* (2013.01);
(Continued)

(58) Field of Classification Search
CPC ........... H04N 5/23216; H04N 5/23206; H04N 5/23229; H04N 5/23293; H04N 5/23296; G06F 3/04845; G06F 3/04847
(Continued)

(56) References Cited

U.S. PATENT DOCUMENTS 6,750,913 B1 * 6/2004 Noro ...................... H04N 5/232
348/207.11
8,582,126 B2 * 11/2013 Ono ...................... H04N 1/0057
358/1.13
(Continued)

FOREIGN PATENT DOCUMENTS

CN 103118227 A 5/2013
CN 203574781 A 4/2014
(Continued)

OTHER PUBLICATIONS

The above patent documents were cited in a European Search Report dated Jun. 6, 2018, which is enclosed, that issued in the corresponding European Patent Application No. 17208911.2.
(Continued)

*Primary Examiner* — David Phantana-angkool
(74) *Attorney, Agent, or Firm* — Cowan, Liebowitz & Latman, P.C.

(57) ABSTRACT

An image capturing control apparatus controls, in accordance with an end of an operation by a user on an image captured by an image capture apparatus, a parameter value according to the operation to be set in the image capture apparatus, and causes a display unit to display a display image which indicates the parameter value according to the operation and is different from the captured image. At a first time point in the middle of the operation by the user and before the parameter value according to the operation is set in the image capture apparatus, the display unit is caused to display the display image corresponding to the parameter value according to the operation at the first time point.

11 Claims, 9 Drawing Sheets

(52) U.S. Cl.
CPC ..... *H04N 5/23206* (2013.01); *H04N 5/23229* (2013.01); *H04N 5/23293* (2013.01); *H04N 5/23296* (2013.01)

(58) Field of Classification Search
USPC ........................................................ 715/755
See application file for complete search history.

(56) References Cited

U.S. PATENT DOCUMENTS

| | | | | |
|---|---|---|---|---|
| 8,837,994 | B2* | 9/2014 | Kuroki | G03G 15/5058 |
| | | | | 399/301 |
| 9,501,719 | B1* | 11/2016 | Horovitz | G06K 9/00201 |
| 9,784,994 | B2* | 10/2017 | Childers | G02C 7/083 |
| 10,277,794 | B2* | 4/2019 | Ikegami | H04N 5/23245 |
| 2012/0114262 | A1* | 5/2012 | Yu | G06T 5/006 |
| | | | | 382/254 |
| 2013/0148013 | A1* | 6/2013 | Shiohara | H04N 5/2353 |
| | | | | 348/362 |
| 2015/0185505 | A1* | 7/2015 | Das | G02C 7/083 |
| | | | | 349/13 |
| 2015/0215524 | A1* | 7/2015 | Zhu | H04N 5/23216 |
| | | | | 348/240.99 |
| 2016/0193104 | A1* | 7/2016 | Du | G02C 7/081 |
| | | | | 351/203 |
| 2016/0286139 | A1* | 9/2016 | Tsuchiya | G06F 3/0362 |
| 2017/0310882 | A1* | 10/2017 | Nagao | G08B 13/19689 |

FOREIGN PATENT DOCUMENTS

| | | |
|---|---|---|
| JP | 11-032324 A | 2/1999 |
| JP | 11-220649 A | 8/1999 |
| JP | 2004-157869 A | 6/2004 |
| JP | 2016-082556 A | 5/2016 |

OTHER PUBLICATIONS

The above references were cited in a Dec. 3, 2019 Chinese Office Action, which is enclosed with an English Translation, that issued in Chinese Patent Application No. 201810029444.6.

* cited by examiner

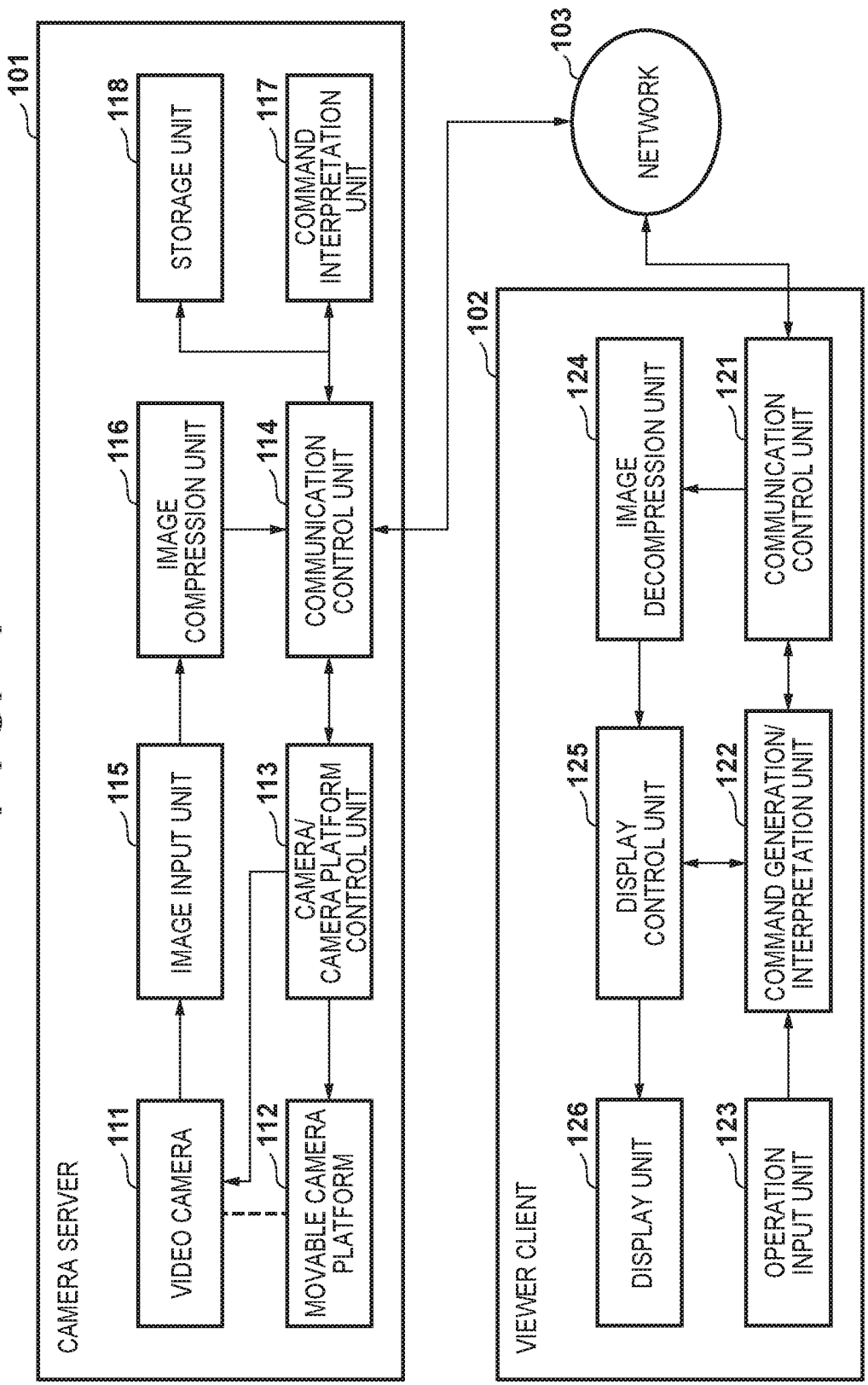

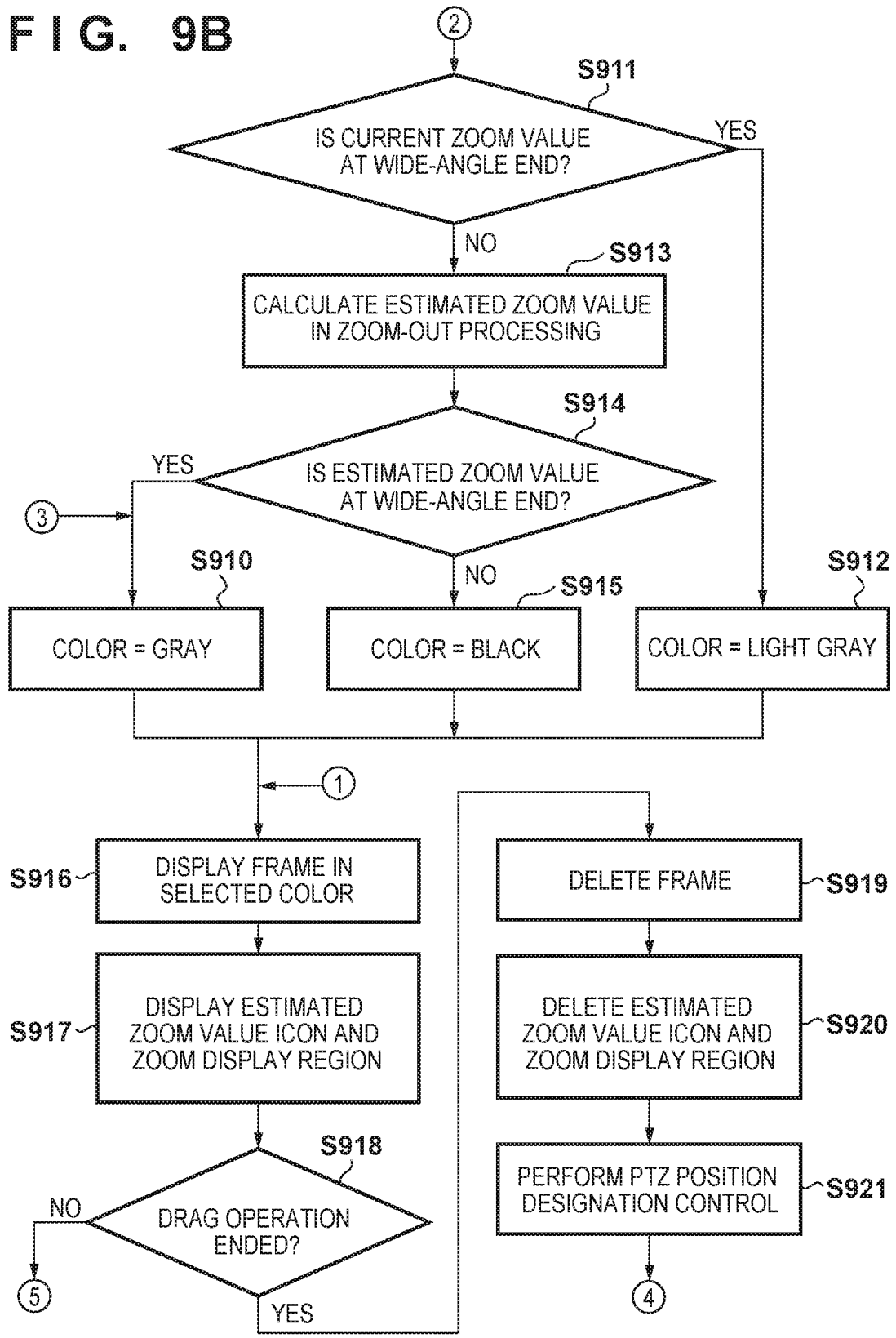

IMAGE CAPTURING CONTROL APPARATUS, METHOD OF CONTROLLING THE SAME AND COMPUTER READABLE STORAGE MEDIUM

BACKGROUND OF THE INVENTION

Field of the Invention

The present invention relates to an image capturing control apparatus that controls a parameter setting to an image capture apparatus, a method of controlling the same and a computer readable storage medium storing a program for causing a computer to perform the method.

Description of the Related Art

One example of control of a network camera includes an area zoom function of zooming in on an area designated by a user on a displayed video. In the area zoom function, pan and tilt area controlled such that the center of the designated area matches the center of a video shot by a camera, and zoom control is performed so as to display the designated area large. A zoom magnification at this time is decided based on the ratio of the size of the area designated by the user and the size of a currently displayed video.

Japanese Patent Laid-Open No. 2004-157869 discloses a shooting apparatus that switches between zoom-in control and zoom-out control accordance with the direction of a user operation (drag operation) for designating an area. According to Japanese Patent Laid-Open No. 2004-157869, zoom-in processing is performed in accordance with a drag operation in a downward oblique direction. At this time, an area according to the length of the drag operation is designated, and the zoom-in processing is performed such that the designated area becomes an angle of view. Zoom-out processing is also performed in accordance with a drag operation in an upward oblique direction. At this time, an area according to the length of the drag operation is designated, and the zoom-out processing is performed such that a current angle of view falls within the designated area.

In a technique disclosed in Japanese Patent Laid-Open No. 2004-157869 described above, a selected portion becomes a next angle of view in the zoom-in processing of an area zoom function, allowing a user to intuitively grasp the degree of the zoom-in processing. In the case of the zoom-out processing, however, it is difficult to intuitively grasp the degree of the zoom-out processing. It is particularly difficult for the user to grasp the degree of the zoom-out processing by the drag operation performed. For example, in a case in which the zoom-out processing is designated by the area zoom function when a zoom state of a camera is almost at a wide-angle end, the zoom-out processing can be performed just a little to the wide-angle end even if a zoom-out degree is instructed largely. Such a situation tends not to be communicated to the user in a general area zoom function, making it difficult for the user to know the way in which the zoom function operates.

SUMMARY OF THE INVENTION

When the action of an apparatus is controlled by an operation performed on a captured image, the following embodiment allows a user to grasp that control state more easily.

According to one aspect of the present invention, there is provided an image capturing control apparatus comprising: a control unit configured to, in accordance with an end of an operation by a user on an image captured by an image capture apparatus, control a parameter value according to the operation to be set in the image capture apparatus; and a display control unit configured to cause a display unit to display a display image which indicates the parameter value according to the operation and is different from the captured image, wherein at a first time point in the middle of the operation by the user and before the control unit controls the parameter value according to the operation to be set in the image capture apparatus, the display control unit causes the display unit to display the display image corresponding to the parameter value according to the operation at the first time point.

According to another aspect of the present invention, there is provided a method of controlling an image capturing control apparatus that sets a parameter value to an image capture apparatus, the method comprising: in accordance with an end of an operation by a user on an image captured by the image capture apparatus, setting a parameter value according to the operation in the image capture apparatus; and performing display control that causes a display unit to display a display image which indicates the parameter value according to the operation and is different from the captured image, wherein in the display control, at a first time point in the middle of the operation by the user and before the parameter value according to the operation is set in the image capture apparatus, the display unit is caused to display the display image corresponding to the parameter value according to the operation at the first time point.

According to another aspect of the present invention, there is provided a computer readable storage medium storing a program for causing a computer to perform a method of controlling an image capturing control apparatus that sets a parameter value to an image capture apparatus, the method comprising: in accordance with an end of an operation by a user on an image captured by the image capture apparatus, setting a parameter value according to the operation in the image capture apparatus; and performing display control that causes a display unit to display a display image which indicates the parameter value according to the operation and is different from the captured image, wherein in the display control, at a first time point in the middle of the operation by the user and before the parameter value according to the operation is set in the image capture apparatus, the display unit is caused to display the display image corresponding to the parameter value according to the operation at the first time point.

Further features of the present invention will become apparent from the following description of exemplary embodiments (with reference to the attached drawings).

BRIEF DESCRIPTION OF THE DRAWINGS

FIG. 1 is a block diagram showing a network camera system according to an embodiment;

FIGS. 9A and 9B are flowcharts showing area zoom processing according to the second embodiment.

DESCRIPTION OF THE EMBODIMENTS

Figure 2A:
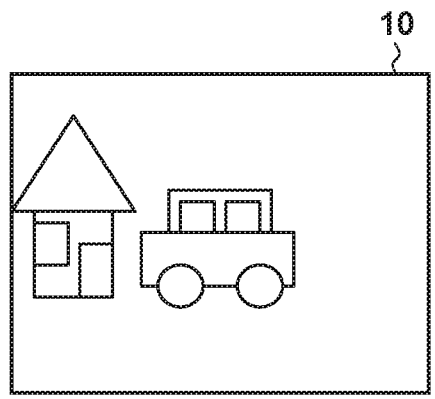
FIGS. 2A to 2D are views for explaining an area zoom (zoom-in) function.

Embodiments of the present invention will be described in detail below with reference to the accompanying drawings. Note that a parameter value (zoom magnification) related to a zoom action of an image capture apparatus is exemplified as a parameter value set in the image capture apparatus in accordance with designation of a partial region for a captured image below. However, the present invention is not limited to this.

First Embodiment

FIG. 1 is a block diagram showing an example of the arrangement of a network camera system according to the first embodiment. In the network camera system of FIG. 1, a camera server 101 delivers live video information from a video camera 111 via a network. A viewer client 102 displays a video transmitted from the camera server 101 on a display unit 126. The viewer client 102 also provides a user with a user interface for ordering a shooting position (pan, tilt, and zoom) for the video camera 111, and functions as an image capturing control apparatus. The camera server 101 and the viewer client 102 are connected by a network 103 capable of IP-based communication such as a LAN or the Internet. Note that the video camera 111 is used in this embodiment. However, a camera that performs still image shooting may be used. Therefore, the video and still image captured by the camera will generally be referred to as captured images below.

Note that the network 103 can be any digital network such as the Internet or an intranet having a band enough to pass a camera control signal and compressed image signal to be described later. In this embodiment, assume that the TCP/IP (UDP/IP) protocol is used as a network protocol of the network 103. Thus, an address indicates an IP address below. Moreover, IP addresses are assigned to all the camera server 101 and viewer client 102.

In accordance with a command received from the viewer client 102 by a communication control unit 114, the camera server 101 distributes image data via the network 103 and performs various camera operations and the like. An image input unit 115 receives an image (captured image) captured by the video camera 111. A moving image of 30 fps can be obtained if images of 30 frames/sec are obtained. An image compression unit 116 compresses the captured image obtained by the image input unit 115 into a data size which is distributed to a client easily. For example, the image compression unit 116 receives an FTSC image signal from the video camera 111, A/D-converts and then compresses this, and transfers the A/D converted signal to the communication control unit 114. The communication control unit 114 sends this compressed captured image to the network 103. A storage unit 118 holds various setting values and data.

The video camera 111 is attached to a movable camera platform 112. A command interpretation unit 117 interprets an operation command received from the viewer client 102 by the communication control unit 114. A camera/camera platform control unit 113 controls the movable camera platform 112 in accordance with control contents interpreted by the operation command by the command interpretation unit 117, controlling a pan angle and tilt angle of the video camera 111. The camera/camera platform control unit 113 also controls a zoom magnification and various image quality settings of the video camera 111 in accordance with the control contents interpreted by the command interpretation unit 117.

The viewer client 102 is connected to the camera server 101 by designating the IP address assigned to the camera server 101. A communication control unit 121 receives a captured image transmitted (compressed) from the camera server 101 and a panoramic image held by the storage unit 118. The communication control unit 121 also receives results of the various camera operations.

A display control unit 125 displays a captured image and panoramic image decompressed by an image decompression unit 124 on the display unit 126. The display control unit 125 also generates a graphical user interface (GUI) from the results of the various camera operations and displays it on the display unit 126. The display unit 126 is a display device such as a display. If a plurality of network cameras (video cameras 111) are connected, it is possible to display captured images from the plurality of network cameras or to select the captured image of one camera.

An operation input unit 123 includes a keyboard, or a pointing device such as a mouse or a touch panel. The user can input an operation for chancing parameter values of the video camera 111 and movable camera platform 112 by using the operation input unit 123. A command generation/interpretation unit 122 generates various camera operation commands from a GUI operation input via the operation input unit 123. The generated camera operation commands are transmitted from the communication control unit 121 to the camera server 101 via the network 103. The command generation/interpretation unit 122 also interprets a camera operation result received from the camera server 101 and transfers it to the display control unit 125.

Hardware arrangements needed in the camera server 101 and viewer client 102 are the same as in a general PC, allowing them to be implemented as software that operates on the general PC. Note that in this embodiment, one camera server 101 and one viewer client 102 are used for the sake of descriptive simplicity. However, there is no limitation on the numbers of connected camera servers and viewer clients. For example, a plurality of camera servers 101 may be connected to one viewer client 102. Further, the video camera 111 and the movable camera platform 112 may be connected to the camera server 101 via the network. Furthermore, the camera server 101 and the viewer client 102 may be implemented by one information processing apparatus.

Figure 10:
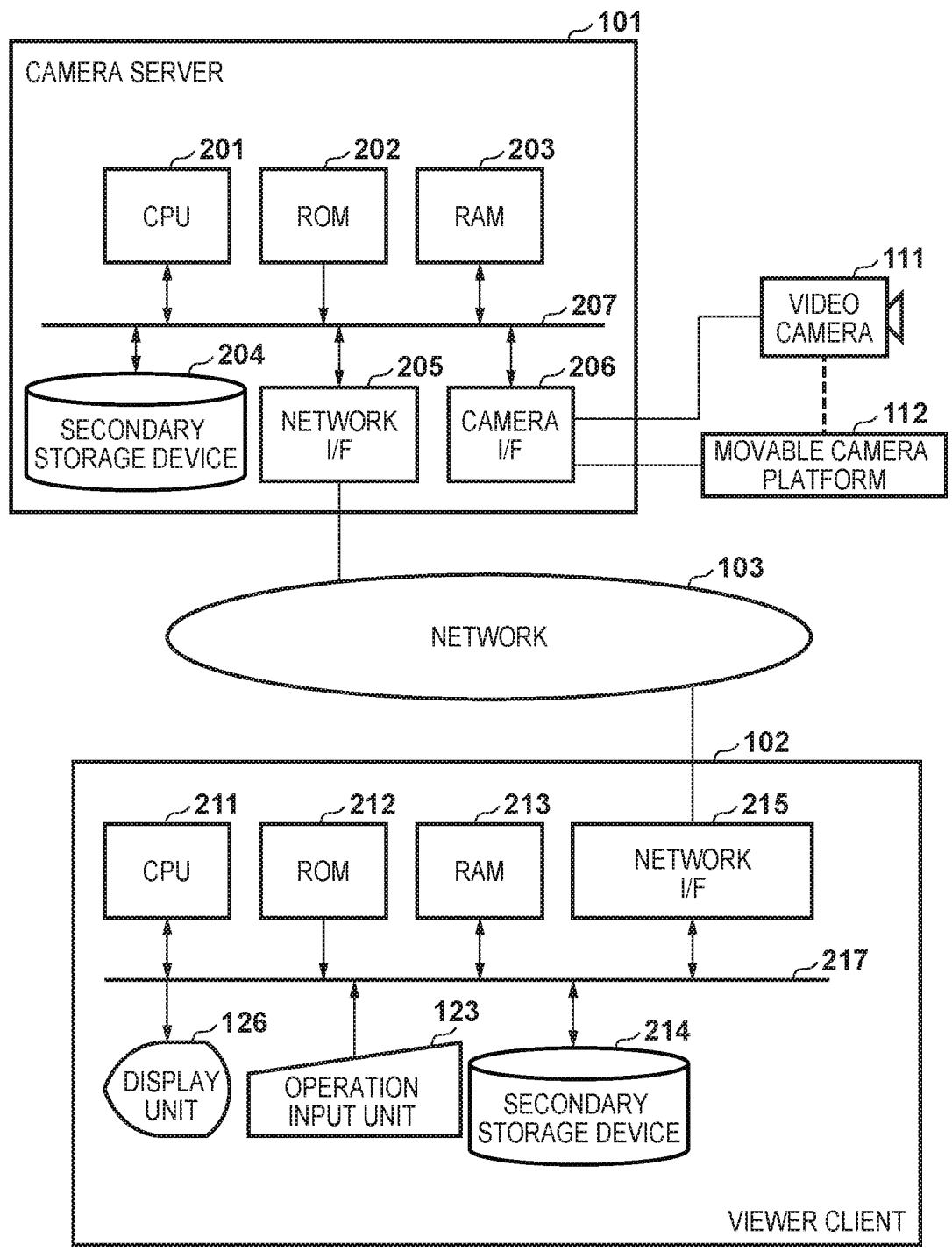
FIG. 10 is a block diagram showing an example of the hardware arrangement of a network camera system.

FIG. 10 is a block diagram showing an example of the hardware arrangement of a network camera system. In the camera server 101, a CPU 201 implements various kinds of control of the camera server 101 by executing programs stored in a ROM 202 or a PAN 203. For example, the CPU 201 executes a predetermined program, implementing the image compression unit 116 and the command interpretation unit 117.

The ROM 202 is a read-only memory. The RAM 203 is a memory capable of read and write as needed. A secondary storage device 204 is a large-capacity storage device such as a hard disk or the like. The CPU 201 implements the storage unit 118 by using the RAM 203 and the secondary storage device 204. A network interface 205 is connected to the network 103, and implements communication between the camera server 101 and the network 103. The CPU 201 implements the communication control unit 114 by using the network interface 205. A camera interface 206 is connected to the video camera 111 and the movable camera platform 112. The CPU 201 implements the image input unit 115 and the camera/camera platform control unit 113 by using the camera interface 206. The above-described respective arrangements are connected to be communicable with each other by a bus 207.

In the viewer client 102, a CPU 211 implements various kinds of control of the viewer client 102 by executing programs stored in a ROM 212 or a RAM 213. For example, the CPU 211 executes a predetermined program, implementing the image decompression unit 124, the display control unit 125, and the command generation/interpretation unit 122. The ROM 212 is a read-only memory. The RAM 213 is a memory capable of read and write as needed. A secondary storage device 214 is a large-capacity storage device such as a hard disk or the like. A network interface 215 is connected to the network 103, and implements communication between the viewer client 102 and the network 103. The CPU 211 implements the communication control unit 121 by using the network interface 215. The operation input unit 123, the display unit 126, and the above-described respective arrangements are connected to be communicable with each other by a bus 217.

Figure 2B:
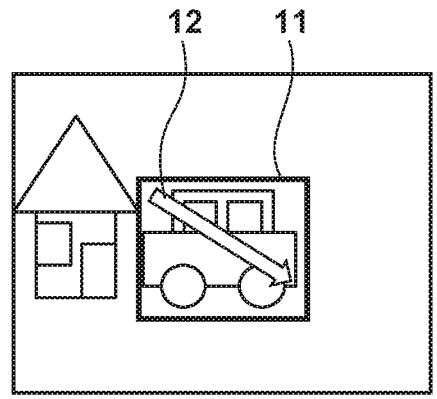
Figure 2C:
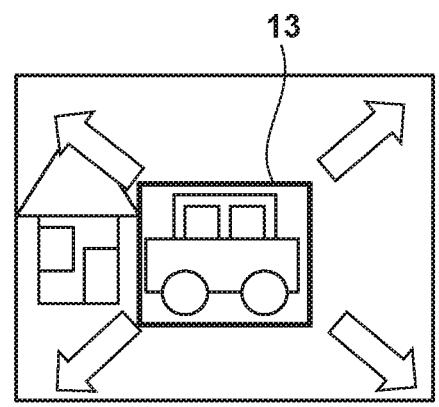
Figure 2D:
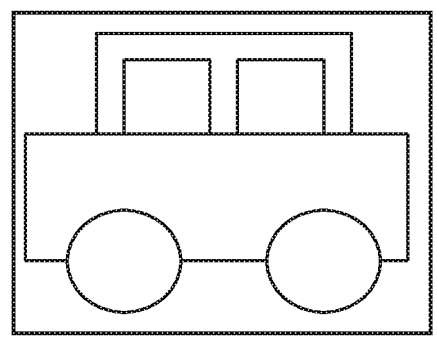

A designation operation and zoom action of the user in zoom-in processing by an area zoom function will be described next with reference to FIGS. 2A to 2D. FIG. 2A is a display example of a captured image on the display unit 126. The image captured by the video camera 111 is displayed on a screen 10. FIG. 2B shows an example of a state in which the user performs a drag operation on the screen 10 via the operation input unit 123 in the situation of FIG. 2A. The drag operation is an example of a designation operation by the user. In accordance with a drag operation 12 by the user, a frame 11 indicating a partial region of the captured image is displayed. FIG. 2C shows an example when drag operations end in the state of FIG. 2B. The drag operation 12 is in a direction that moves toward the right on the captured image, and thus interpreted as a zoom-in instruction. The viewer client 102 controls the video camera 111 such that a frame 13 generated by the drag operation 12 becomes a next angle of view. FIG. 2D shows a state after the zoom control of the video camera 111 is performed in accordance with the frame 13. As described above, in the zoom-in processing in the area zoom function, the portion of the frame 13 generated in FIG. 2C becomes the angle of view.

Note that a region indicated by the frame 13 becomes the angle of view, and thus the aspect ratio of a rectangle indicated by the frame 13 matches that of the captured image. In this embodiment, the frame 13 is decided and drawn using a long side of the rectangle having a line that connects the start point and end point of each drag operation as a diagonal line. The frame 13 is also drawn at a position where the start point of each drag operation and a corresponding one of angles of the frame 13 match.

Figure 3A:
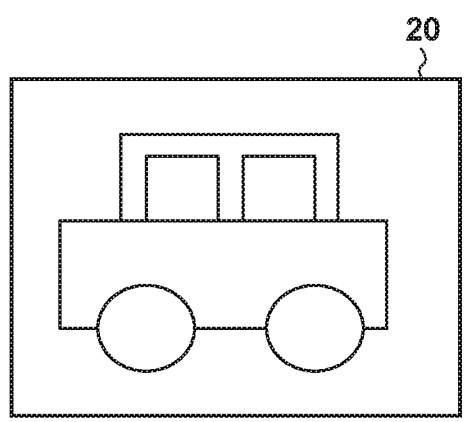
FIGS. 3A to 3D are views for explaining an area zoom (zoom-out) function.
Figure 3B:
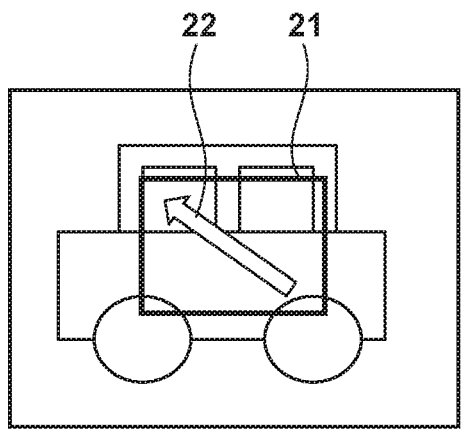
Figure 3C:
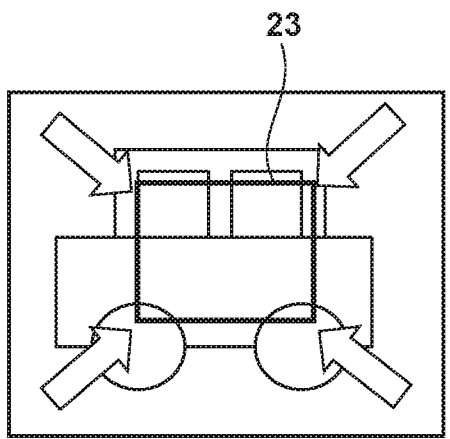
Figure 3D:
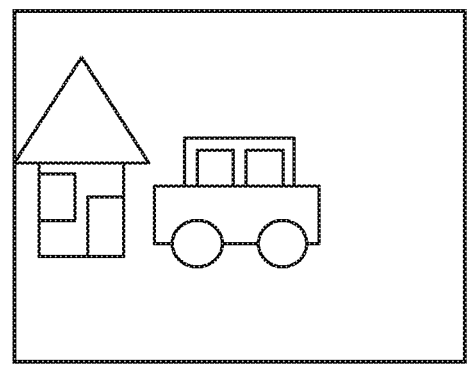

A designation operation and zoom action of the user in zoom-out processing by the area zoom function will be described next with reference to FIGS. 3A to 3D. FIG. 3A is a display example of a captured image on the display unit 126. The image captured by the video camera 111 is displayed on a screen 20. FIG. 3B shows a state in which the user performs a drag operation on the screen 20 via the operation input unit 123 in the situation of FIG. 3A. A frame 21 is displayed in accordance with a drag operation 22. FIG. 3C shows an example when drag operations end in the state of FIG. 3B. The drag operation 22 is in a direction that moves toward the left on the captured image, and thus interpreted as a zoom-out instruction. The video camera 111 is controlled such that a current angle of view fails within a generated frame 23. FIG. 3D shows a state after the zoom control (zoom-out) of the video camera 111 is performed in accordance with the frame 23. Referring to FIG. 3D, the angle of view at the time of FIG. 3C falls within a portion selected in the frame generated in FIG. 3C. Note that the aspect ratio and drawing position of the frame 23 are the same as the frame 13. In addition to a zoom change described above, the tilt and pan directions of the video camera 111 are also changed such that the center position of the frame 13 or frame 23 becomes the center position of the captured image.

As described above, in the zoom-in processing (FIGS. 2A to 2D) of the area zoom function, the frame 13 set in accordance with the user designation operation becomes the next angle of view, allowing the user to intuitionally grasp a state after execution of the zoom-in processing. In the case of the zoom-out processing, however, it is difficult to intuitionally grasp the degree of the zoom-out processing, as shown in FIGS. 3C and 3D.

Figure 4A:
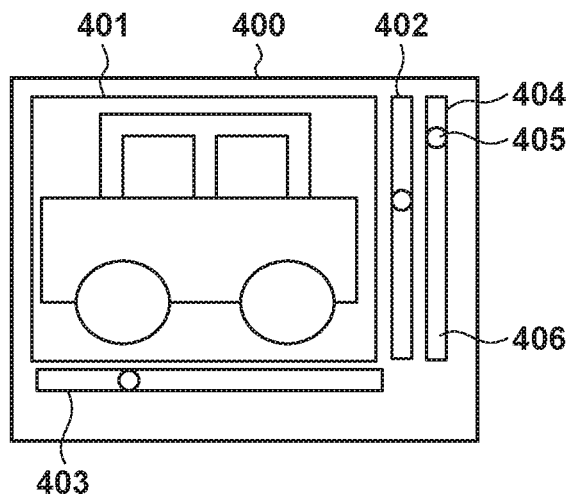
FIGS. 4A and 4B are views for explaining zoom sliders according to the embodiment.
Figure 4B:
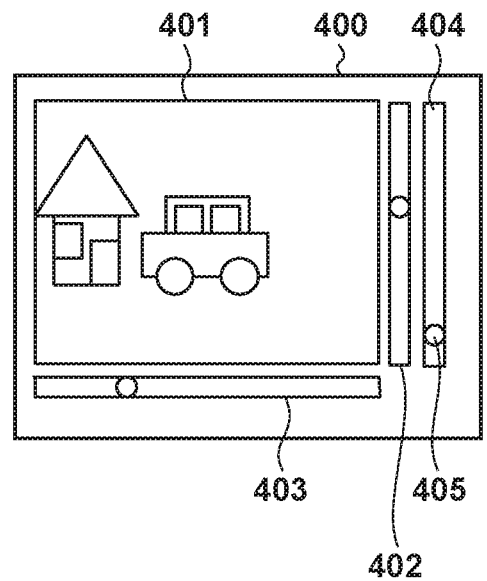

FIGS. 4A and 4B are views each representing an example of a screen displayed on the display unit 126 of the viewer client 102 to which the user interface is applied according to this embodiment.

A camera operation screen 400 shown in each of FIGS. 4A and 4B is displayed on the display unit 126. On the camera operation screen 400, a captured image received from the camera server 101 is displayed in an image display region 401. In addition, a tilt slider 402, pan slider 403, and zoom slider 404 for changing parameter values set in the image capture apparatus (the video camera 111 and the movable camera platform 112) are displayed on the camera operation screen 400 as operation images different from the captured image. The user can control the tilt, pan, and zoom of the video camera 111 by operating the tilt slider 402, the pan slider 403, and the zoom slider 404. On the zoom slider 404, a current zoom value of the video camera 111 is indicated by a zoom value icon 405. A telephoto state is obtained as the zoom value icon 405 moves upward on the zoom slider 404, and a wide angle is obtained as the zoom value icon 405 moves downward. The user can control tilt, pan, or zoom by clicking on the tilt slider 402, the pan slider 403, or the zoom slider 404.

FIG. 4B is the view showing the display state of the camera operation screen 400 when a position 406 on the zoom slider 404 is clicked in the state of FIG. 4A, and the zoom control of the video camera 111 according to this ends. On the zoom slider 404, the zoom value icon 405 indicating a current zoom state moves to the position 406 (FIG. 4A) clicked on the zoom slider 404. In accordance with this, the captured image in the image display region 401 is switched to a wide-angle image. The zoom value icon 405 of the zoom slider 404 thus represents the current zoom value by its display position.

Note that the same operation can also be performed on the tilt slider 402 and the pan slider 403. That is, if a desired position of the tilt slider 402 is clicked, the movable camera platform 112 changes the tilt direction of the video camera 111 in accordance with the clicked position. If a desired position of the pan slider 403 is clicked, the movable camera platform 112 changes the pan direction of the video camera 111 in accordance with the clicked position.

Figure 5A:
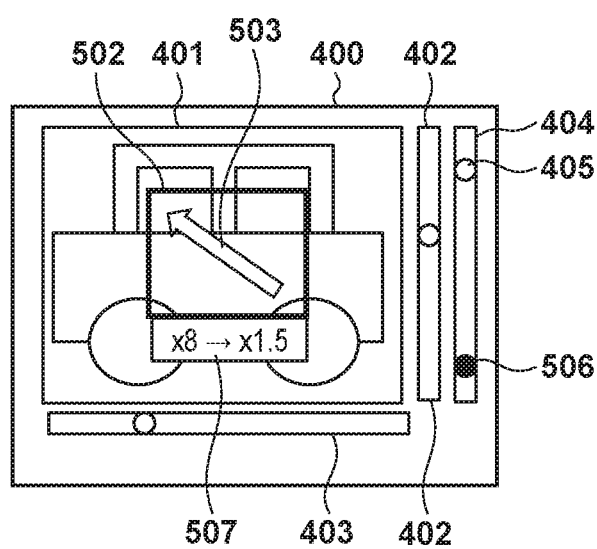
FIGS. 5A and 5B are views each for explaining display at the time of zoom-out processing according to the embodiment.
Figure 5B:
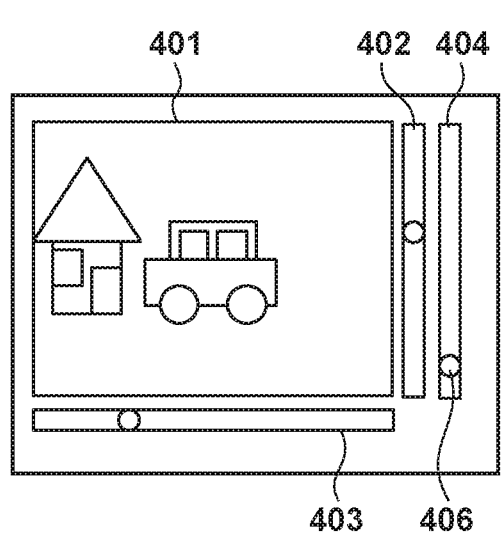

Zoom-out processing in the area zoom function of this embodiment will be described next with reference to FIGS. 5A and 5B. FIGS. 5A and 5B are views showing a zoom-out action of the area zoom function. The camera operation screen 400 of FIG. 5A is displayed on the display unit 126. A captured image received from the camera server 101 is displayed in the image display region 401. In FIG. 5A, the user inputs a drag operation 503. A frame 502 is displayed in accordance with the drag operation 503 by the user. This action is the same as the action described with reference to FIG. 3B. As described with reference to FIG. 4A, the zoom value icon 405 on the zoom slider 404 indicates the current zoom value. An estimated zoom value icon 506 indicates a zoom value when area zoom is performed based on the currently displayed frame 502. Note that the zoom value icon 405 and the estimated zoom value icon 506 are desirably displayed in different display forms so as to allow the user to distinguish them from each other. In FIG. 5A, the estimated zoom value icon 506 is a black icon such that it can be distinguished from the zoom value icon 405 by an appearance.

In a zoom value display region 507, a current zoom value is indicated on the left, and a zoom value when area zoom is performed in the currently displayed frame 502 is indicated on the right. For example, the video camera 111 is a 10× zoom camera, and the zoom value display region 507 indicates that current 8× zoom is switched to 1.5× zoom. FIG. 5B is the view showing the display state of the camera operation screen 400 when the zoom control of the video camera 111 ends after the user terminates the drag operation in the state of FIG. 5A. A captured image after the zoom-out processing is displayed in the image display region 401. The zoom value icon 405 is moved to a position corresponding to a zoom value after the zoom-out processing. As described above, in this embodiment, the user can grasp the zoom value after area zoom by the estimated zoom value icon 506 displayed on the zoom slider 404 before determining the frame 502 at the time of area zoom. That is, the display control unit 125 displays, on the display unit 126, a display image for indicating a parameter value generated in accordance with a designation operation by the user different from the captured image before the update of the parameter value of the video camera 111 in the middle of the designation operation. The estimated zoom value icon 506 and the zoom value display region 507 are shown above as an example of a display image indicating the parameter value in the middle of the designation operation.

Note that the zoom-out processing has been described with reference to FIGS. 5A and 5B. However, the same also applies to the case of zoom-in processing. That is, in a zoom-in operation, the user can also grasp the zoom value after area zoom by the displays of the zoom value display region 507 and the estimated zoom value icon 506 on the zoom slider 404 before the frame to be generated by the drag operation is determined. In this embodiment, the display of the estimated zoom value icon 506 and the display of the zoom value in the zoom value display region 507 are performed simultaneously. However, one of these may be performed.

Figure 6:
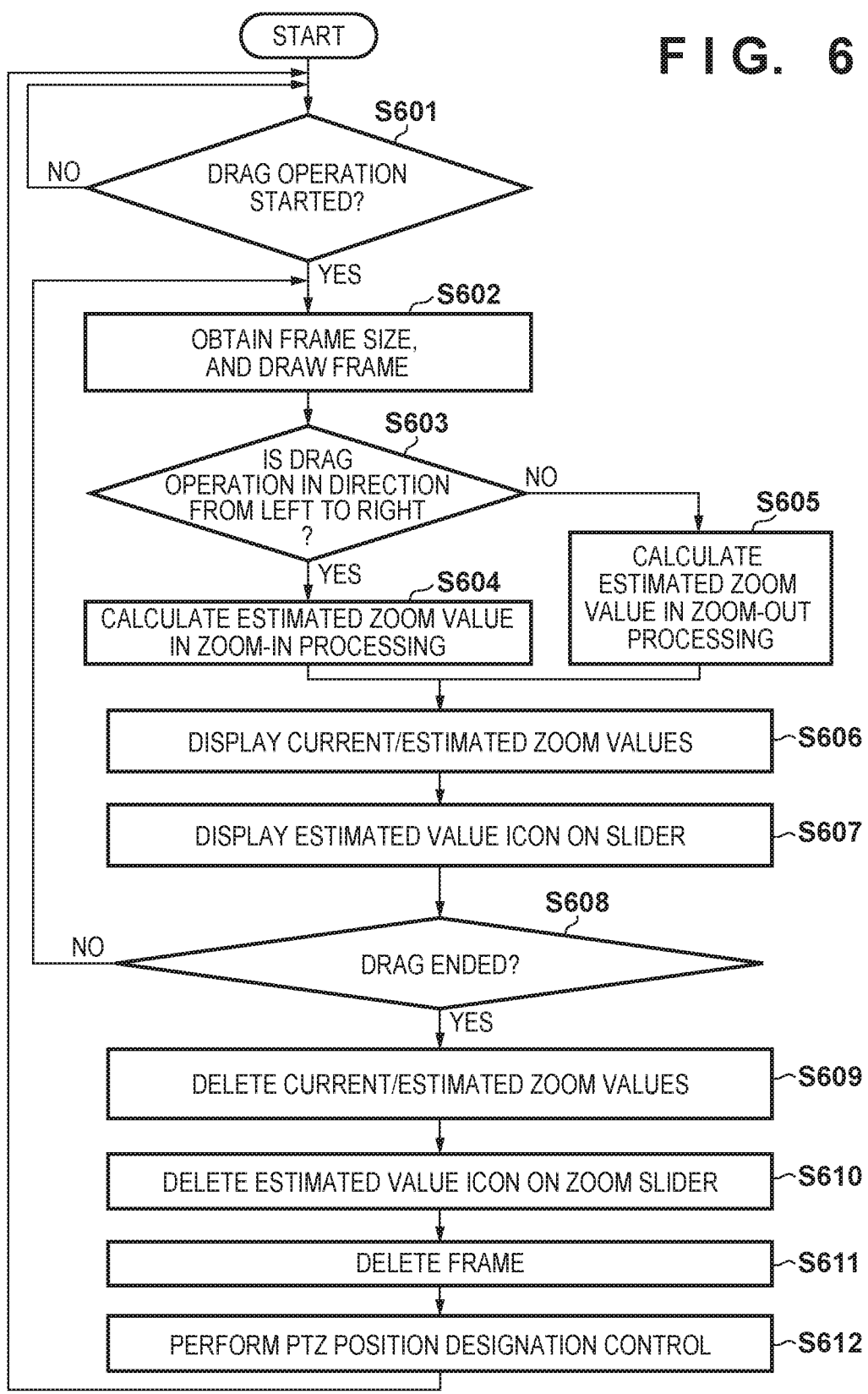
FIG. 6 is a flowchart showing area zoom processing according to the first embodiment.

Processing in the first embodiment will be described next with reference to a flowchart of FIG. 6. FIG. 6 is the flowchart showing a process of controlling the display of the estimated zoom value icon 506 and the display of the zoom value display region 507. Note that the control of tilt, pan, and zoom using the tilt slider 402, the pan slider 403, and the zoom slider 404 described with reference to FIGS. 4A and 4B is performed in parallel separately from the process shown in FIG. 6.

The control shown in FIG. 6 starts in a state in which the camera operation screen 400 shown in FIG. 4A is displayed. First, in step S601, the command generation/interpretation unit 122 determines whether the user starts a drag operation via the operation input unit 123. If the command generation/interpretation unit 122 determines in step S601 that the drag operation is not started, step S601 is repeated until determines that the drag operation is started.

If the command generation/interpretation unit 122 determines in step S601 that the drag operation is started, in step S602, it obtains and holds a frame size according to the drag operation. The display control unit 125 draws the frame according to the drag operation on a captured image displayed on the display unit 126. Subsequently, in step S603, the command generation/interpretation unit 122 determines whether the drag operation is in a direction from the left to the right. As described with reference to FIGS. 2A to 2D and FIGS. 3A to 3D, whether an operation instruction is zoom-in processing or zoom-out processing is decided by the direction of each drag operation. In this embodiment, it is decided that the drag operation is the zoom-in processing if it includes a component in the direction from the left to the right, and is the zoom-out processing if it includes a component in the direction from the right to the left. Note that the frame size obtained in step S602 and the direction of the drag operation obtained in step S603 are as described with reference to FIGS. 2A to 2D and FIGS. 3A to 3D.

If the command generation/interpretation unit 122 determines in step S603 that the drag operation is in the direction from the left to the right, the zoom-in processing is performed. In this case, in step S604, the command generation/interpretation unit 122 calculates an estimated zoom value when the zoom-in processing is performed with the frame size obtained in step S602. On the other hand, if the command generation/interpretation unit 122 determines in step S603 that the drag operation is not in the direction from the left to the right, the zoom-out processing is performed. In this case, in step S605, the command generation/interpretation unit 122 calculates an estimated zoom value when the zoom-out processing is performed with the frame size obtained in step S602.

When step S604 or step S605 ends, in step S606, the display control unit 125 displays a current zoom value of the video camera 111 and the estimated zoom value of in step S604 or step S605 in the zoom value display region 507. Subsequently, in step S607, the display control unit 125 displays the estimated zoom value icon 506 at a position corresponding to the estimated zoon value obtained in step S604 or step S605 on the zoom slider 404. In step S608, the command generation/interpretation unit 122 determines whether the drag operation ends. If the command generation/interpretation unit 122 determines that the drag operation does not end, the process returns to step S602.

If the command generation/interpretation unit 122 determines in step S608 that the drag operation ends, the display control unit 125 deletes the display of the zoom value display region 507 in step S609. Then, in step S610, the display control unit 125 deletes the estimated zoom value icon 506 on the zoom slider 404. In step S611, the display control unit 125 also deletes the frame 502 displayed in step S602. Subsequently, in step S612, the command generation/interpretation unit 122 generates parameter values for changing pan, tilt, and zoom of the video camera 111 in accordance with the start position and final end position of the drag operation, and sends an instruction to the camera server 101 (PTZ position designation control). Subsequently, the process returns to step S601 in which the command generation/interpretation unit 122 waits for a next drag operation.

Note that in this embodiment, both the display of the zoom value display region 507 in step S606 and the display of the estimated zoom value icon 506 in step S607 are performed. However, only one of these may be performed. In this case, one of step S606 and step S607 is omitted.

As described above, according to the first embodiment, when the area zoom function is used, the estimated zoom value icon 506 is displayed on the zoom slider 404, and the current zoom value and the estimated zoom value are displayed in the zoom value display region 507. By performing such display regarding the estimated zoom value, a problem that the zoom action of the area zoom function, in particular, at the time of zoom-out processing is difficult to understand is solved, making it possible to notify the user of the zoom action simply. This allows the user to grasp the degree of zoom at a glance when selecting an area (frame), improving usability of area zoom.

Second Embodiment

In the first embodiment, the arrangement for improving convenience of area zoom by notifying the user of the estimated zoom value has been described. In the second embodiment, the display of an area zoon frame generated in accordance with a drag operation is further devised. More specifically, the display form of the frame is changed if a zoom state is at a zoom end or its vicinity, and zoom-in processing cannot be performed by an instructed amount, or if the zoon state is at a wide-angle end or its vicinity, and zoom-out processing cannot be performed by an instructed amount. This allows a user to grasp a state in which an instructed zoom operation cannot be performed due to the limit of a zoom action. That is, the user can grasp that a parameter value instructed by a designation operation exceeds a limiting value in the middle of the designation operation. The basic arrangement of the second embodiment is the same as in the first embodiment (FIGS. 1 and 10).

Figure 7A:
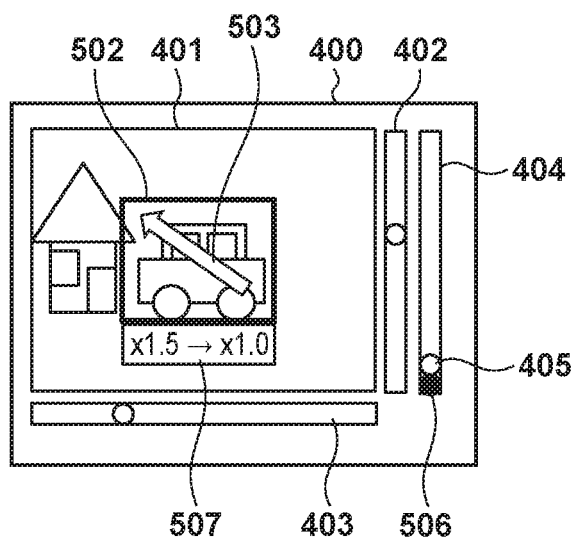
FIGS. 7A and 7B are views each for explaining display at the time of zoom-out processing in a zoom state close to a wide-angle end.

Zoom frame display in the second embodiment will be described with reference to FIGS. 7A and 7B. In FIG. 7A, a camera operation screen 400 is a screen displayed on a display unit 126. FIG. 7A shows an example in which the user inputs a drag operation 503 using an operation input unit 123 when a captured image is displayed in an image display region 401. In this example, even if the user tries to perform zoom-out processing based on a frame 502 having a size designated by the drag operation 503, a wide-angle end is reached in the middle of the processing. It is therefore impossible to perform zoom-out processing according to calculation based on the size of the frame 502. A zoom value icon 405 is displayed at a position (for example, 1.5 times) close to the lower end (the side of the wide-angle end) of a zoom slider 404. An estimated zoom value icon 506 is displayed at the lower end of the zoom slider 404 and indicates that an estimated zoom value based on the size of the frame 502 reaches the wide-angle end (for example, 1 time). The same also applies to a zoom value display region 507.

As described above, if the zoon action designated by the drag operation 503 exceeds the limit of the zoom action, the frame 502 generated in accordance with such a drag operation 503 is changed in its display form. In this embodiment, the frame 502 is displayed in gray, and a display color of the frame 502 shown in FIG. 7A becomes lighter than that shown in FIG. 5A. By thus making the display form of the frame 502 different from a normal one, it is possible to indicate to the user that the display form is different from the normal one. Note that the color of the zoom value display region 507 is also displayed in gray in accordance with this.

Figure 7B:
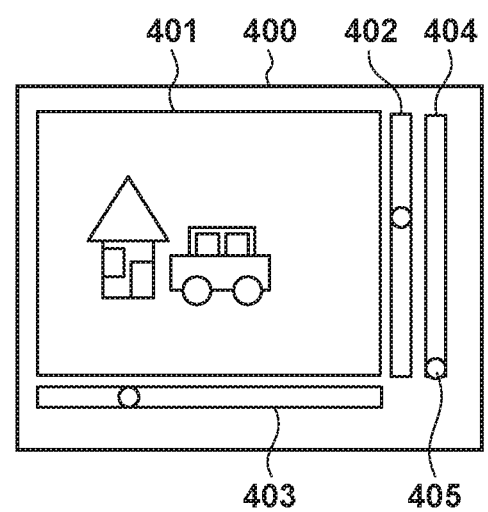

FIG. 7B a view after a video camera 111 performs a zoom action after the drag operation ends in the state of FIG. 7A. A captured image displayed in the image display region 401 is zoomed out a bit as compared to FIG. 7A. The zoom value icon 405 moves to the lower end of the zoom slider 404.

Note that processing in a case in which the zoom-out processing according to the frame designated by the user cannot be performed because the wide-angle end is reached in the middle of designating the zoom-out processing has been described with reference to FIGS. 7A and 7B. The same also applies to processing in a case in which zoom-in processing according to a frame designated by the user cannot be performed because a zoom end is reached in the middle of designating the zoom-in processing. In this embodiment, the color of a line indicating the frame 502 is changed from a normal color (FIG. 5A). However, the present invention is not limited to this. Changes in various display forms, for example, a change in type of line indicating the frame 502 from a solid line to a dotted line, a change in width of the line indicating the frame 502 to be smaller, and the like are applicable.

Processing regarding frame display in the second embodiment will further be described with reference to FIGS. 8A and 8B. A case in which a drag operation for further zooming out on an image in a state in which an angle of view has already reached a wide-angle end will be described with reference to FIGS. 8A and 8B.

Figure 8A:
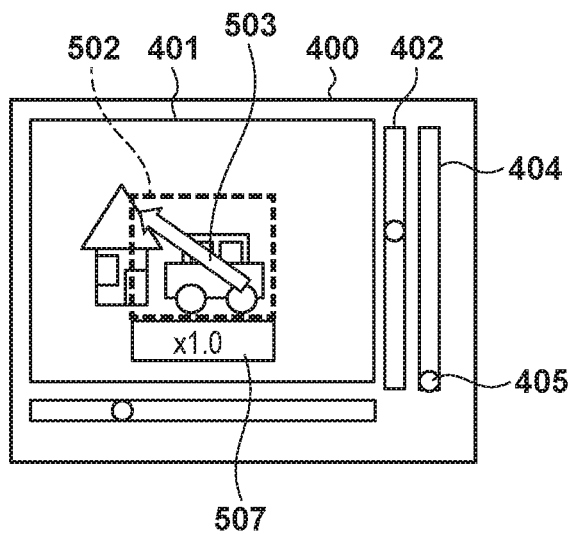
FIGS. 8A and 8B are views each for explaining display at the time of the zoom-out processing when zoom is at the wide-angle end.

FIG. 8A shows an example in which the user performs the drag operation 503 for zoom-out processing for a captured image via the operation input unit 123 when the captured image is displayed in the image display region 401. In this example, since the angle of view has already reached the wide-angle end, the zoom-out processing cannot be performed anymore even the user tries to perform it. The zoom value icon 405 on the zoom slider 404 is displayed at the wide-angle end of the zoom slider 404. The frame 502 is displayed by the dotted line as shown in FIG. 8A and with a line having a color much lighter than that of the frame 502 in FIG. 7A. This is to inform the user that the zoom-out processing cannot be performed at all. Only ×1.0 indicating 1 time of a current magnification only is displayed in a zoom value display area.

Figure 8B:
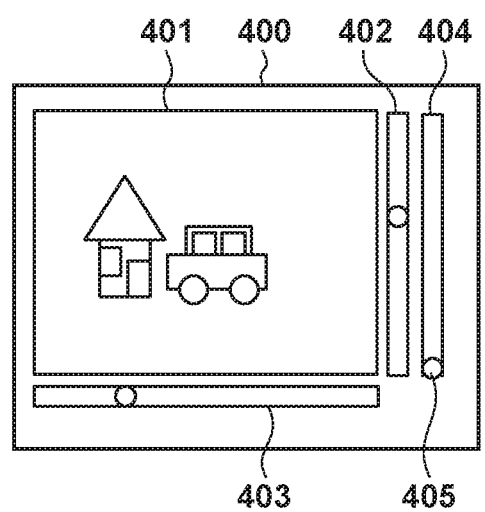

FIG. 8B is a view after the drag operation ends in the state of FIG. 8A. A captured image displayed in the image display region 401 is the same as the captured image displayed in FIG. 8A. This is because the zoom state has already reached the wide-angle end, and thus the zoom-out processing cannot be performed anymore. However, if the center position of the frame 502 moves from the center position of the captured image, movement in pan and tilt directions by that moving amount is performed.

Note that the processing in the case in which the zoom-out processing cannot be performed because the zoom state has already reached the wide-angle end at the time of zoom-out designation has been described with reference to FIGS. 8A and 8B. However, the same processing is also obtained in a case in which zoom-in processing cannot be performed because the zoon state has already reached the zoom end at the time of zoom-in designation. In the second embodiment, the frame 502 is displayed by the dotted line and in a light color, and the zoom value display region 507 is displayed in a light color. However, the present invention is not limited to this. For example, the frame 502 may not be displayed, the line thickness of the frame 502 may be changed (decreased), or the like.

Figure 9A:
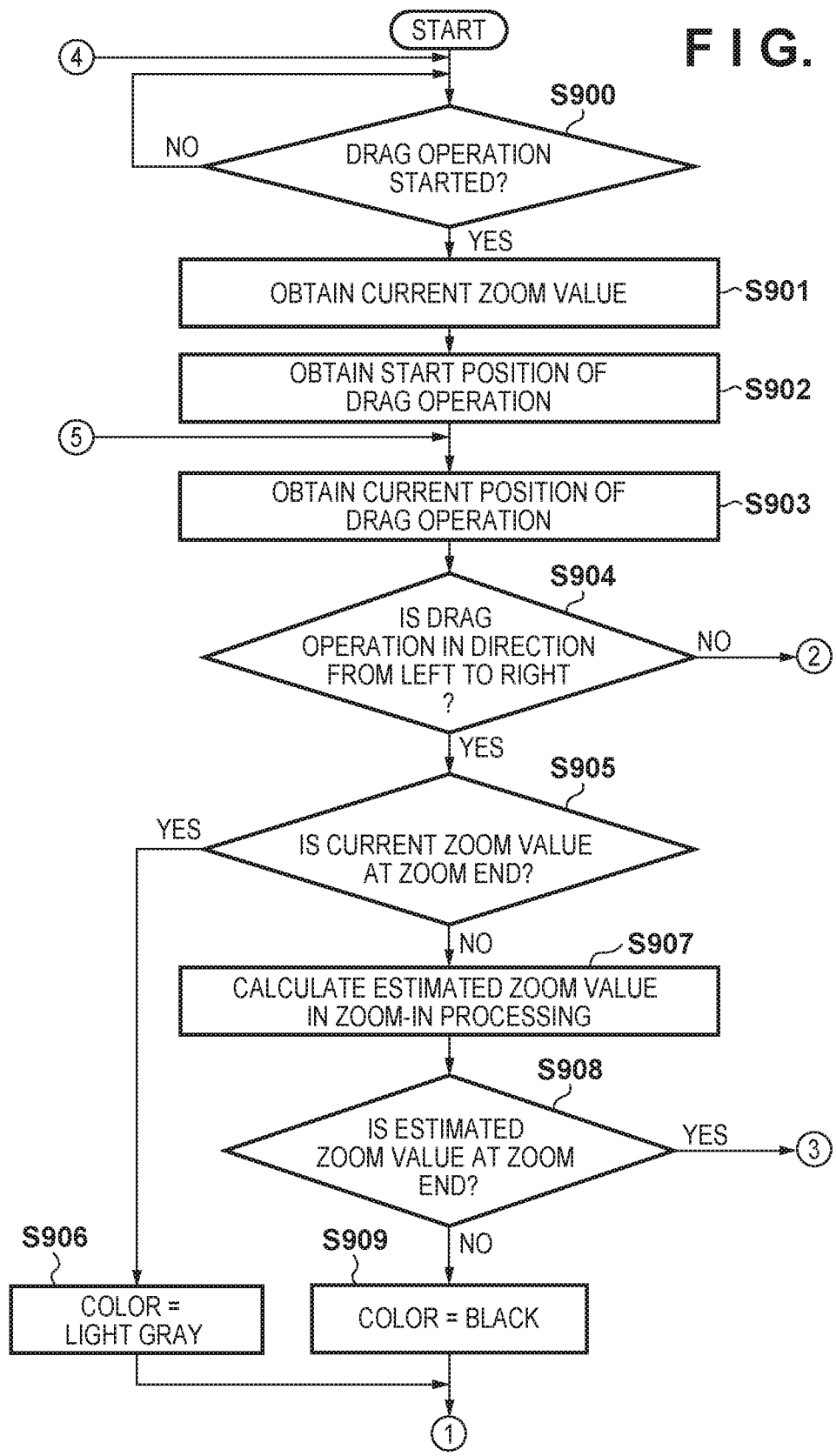

Processing of the second embodiment will be described next with reference to flowcharts of FIGS. 9A and 9B. FIGS. 9A and 9B are the flowcharts for explaining a process of an area zoom function, and show a process of changing the display form of the frame 502 as shown in FIGS. 5A and 5B, FIGS. 7A and 7B, and FIGS. 8A and 8B in accordance with respective conditions. As can be seen from the zoom value display region 507 shown in each of FIGS. 5A and 5B, FIGS. 7A and 7B, and FIGS. 8A and 8B, the color of the zoom value display area is also changed by the color of the frame decided here.

When the process shown in FIGS. 9A and 9B starts, first, in step S900, a command generation/interpretation unit 122 determines whether a drag operation by the user is started. If the command generation/interpretation unit 122 determines in step S900 that the drag operation is not started, step S900 is repeated until it determines that the drag operation started. If the command generation/interpretation unit 122 determines in step S900 that drag is started, it obtains a current zoom value in step S901. Then, in step S902, the command generation/interpretation unit 122 obtains a start position of the drag operation. Then, in step S903, the command generation/interpretation unit 122 obtains a current position of the drag operation (for example, a current position of a mouse).

In step S904, the command generation/interpretation unit 122 determines whether drag is in a direction from the left to the right from the start position of the drag operation obtained in step S902 and the current position of the drag operation obtained in step S903. If the command generation/interpretation unit 122 determines in step S904 that the drag operation is in the direction from the left to the right, it determines that zoom-in processing is instructed. In this case, the process advances to step S905 in which the command generation/interpretation unit 122 determines whether the current zoom value obtained in step S901 is at a zoom end. If the command generation/interpretation unit 122 determines that the current zoom value is at the zoom end, the process advances to step S906 in which it decides a display color (frame color) to be light gray.

If the command generation/interpretation unit 122 determines in step S905 that the current zoom value is not at the zoom end, the process advances to step S907. In step S907, the command generation/interpretation unit 122 calculates an estimated zoom value when a zoom-in action according to the drag operation at the start position obtained in step S902 and the end position obtained in step S903 is performed. Then, in step S908, the command generation/interpretation unit 122 determines whether the estimated zoom value is at a zoom end. If the command generation/interpretation unit 122 determines that the estimated zoom value is at the zoom end, the process advances to step S910 in which it decides the frame color to be gray. If the command generation/interpretation unit 122 determines in step S908 that the estimated zoom value is not at the zoom end, the process advances to step S909 in which it sets the frame color to black.

On the other hand, in step S904, if the command generation/interpretation unit 122 determines that the drag operation is not in the direction from the left to the right, it determines that zoom-out processing is instructed. In this case, the process advances to step S911 in which the command generation/interpretation unit 122 determines whether the current zoom value obtained in step S901 is at a wide-angle end. If the command generation/interpretation unit 122 determines that the current zoom value is at the wide-angle end, the process advances to step S912 in which it decides the display color (frame color) to be light gray.

If the command generation/interpretation unit 122 determines in step S911 that the current zoom value is not at the wide-angle end, the process advances to step S913. In step S913, the command generation/interpretation unit 122 calculates an estimated zoom value when a zoom-out action according to the drag operation at the start position obtained in step S902 and the end position obtained in step S903 is performed. Then, in step S914, the command generation/interpretation unit 122 determines whether the estimated zoom value is at the wide-angle end. If the command generation/interpretation unit 122 determines that the estimated zoom value is at the wide-angle end, the process advances to step S910 in which it decides the frame color to be gray. On the other hand, if the command generation/interpretation unit 122 determines in step S914 that the estimated zoom value is not at the wide-angle end, the process advances to step S915 in which it decides the frame color to be black.

In step S916, a display control unit 125 displays the frame 502 on the display unit 126 in accordance with the color decided step S906, S909, S910, S912, or S915. Then, in step S917, the display control unit 125 displays the estimated zoom value icon 506 at the position of the estimated zoom value on the zoom slider 404, and displays the current zoom value and the estimated zoom value in the zoom value display region 507. The display control unit 125 uses the color decided for the frame as the display color of the zoom value display region 507. Note that the color of the estimated zoom value icon 506 may be changed by using the color decided for the frame.

Then, in step S918, the command generation/interpretation unit 122 determines whether the drag operation ends. If the command generation/interpretation unit 122 determines that the drag operation does not end, the process returns to step S903. If the command generation/interpretation unit 122 determines in step S918 that drag ends, the process advances to step S919 in which the display control unit 125 deletes the frame 502 displayed in step S916. In step S920, the display control unit 125 also deletes the estimated zoom value icon 506 and zoom value display region 507 displayed in step S917. Then, in step S921, the command generation/interpretation unit 122 generates a command to change pan, tilt, and zoom of the video camera 111 in accordance with the start position and final end position of the drag operation obtained in steps S902 and S903. The command generation/interpretation unit 122 sends the generated command to a camera server 101 (PTZ position designation control). Subsequently, the process returns to step S900 in which the command generation/interpretation unit 122 waits for a next drag operation.

As described above, in a network camera system of the second embodiment, the user can easily grasp that the zoom action reaches its limit in the middle of designating the action by designating the region of a captured image, making it impossible to perform zoom-out processing according to the designated region.

As described above, according to the above embodiments, in area zoom that instructs the zoom action by designating the region of the captured image, a zoom position when control corresponding to a region being selected by the user is performed is displayed to the user simply. An action to be different from a normal one can also be displayed to the user simply if it is estimated that a desired action is not obtained because a zoom end or a wide-angle end is reached before the control corresponding to the region is complete.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-004607, filed Jan. 13, 2017 which is hereby incorporated by reference herein in its entirety.

What is claimed is:

1. An image capturing control apparatus comprising:
an accept unit configured to accept an operation by a user on an image captured by an image capture apparatus, wherein a first position and a second position is designated by the operation; and
a display control unit configured to cause a display unit to display a first display image which indicates a first parameter value that changes according to the operation and a second display image which indicates a second parameter value that is being set in the image capture apparatus, wherein the first display image and the second display image are different from the captured image and the first parameter and the second parameter are related to a zoom action of the image capture apparatus,
wherein the display control unit causes the display unit to keep displaying the first display image while the operation is being performed.

2. The apparatus according to claim 1, wherein the display control unit causes the display unit to display an operation image for changing the first parameter value, and the operation image also serves as the display image.

3. The apparatus according to claim 1, wherein the display control unit displays, in the captured image, a frame for indicating a region defined by the first position and the second position designated by the operation.

4. The apparatus according to claim 3, wherein the display control unit changes a display form of the frame if the first parameter value instructed by the operation exceeds a limiting value in the middle of the operation.

5. The apparatus according to claim 3, wherein the display control unit changes a display form of the frame if the second parameter value that is being set in the image capture apparatus is a limiting value, and the operation is an instruction to change the parameter value in a direction that further exceeds the limiting value.

6. The apparatus according to claim 4, wherein in a change in display form of the frame, at least one of a thickness, a color, and a type of line indicating the frame is changed.

7. The apparatus according to claim 1, wherein the operation is a drag operation for the captured image, and a parameter value of the zoom action is decided based on a rectangular region designated by the drag operation.

8. The apparatus according to claim 7, wherein it is determined, based on a direction of the drag operation, whether one of a zoom-in instruction and a zoom-out instruction is given.

9. The apparatus according to claim 1, further comprising a deletion unit configured to delete the first display image in accordance with the end of the operation.

10. A method of controlling an image capturing control apparatus that sets a parameter value to an image capture apparatus, the method comprising:
accepting an operation by a user on an image captured by an image capture apparatus, wherein a first position and a second position is designated by the operation; and
performing display control that causes a display unit to display a first display image which indicates a first parameter value that changes according to the operation and a second display image which indicates a second display image which indicates a second parameter value that is being set in the image capture apparatus, wherein the display image is different from the captured image and the first parameter and the second parameter are related to a zoom action of the image capture apparatus,
wherein in the display control, the display unit is caused to keep displaying the first display image while the operation is being performed.

11. A non-transitory computer readable storage medium storing a program for causing a computer to perform a method of controlling an image capturing control apparatus that sets a parameter value to an image capture apparatus, the method comprising:
accepting an operation by a user on an image captured by an image capture apparatus, wherein a first position and a second position is designated by the operation; and
performing display control that causes a display unit to display a first display image which indicates a first parameter value that changes according to the operation and a second display image which indicates a second parameter value that is being set in the image capture apparatus, wherein the display image is different from the captured image and the first parameter and the second parameter are related to a zoom action of the image capture apparatus, wherein in the display control, the display unit is caused to keep displaying the first display image while the operation is being performed.

* * * * *